Patented June 13, 1933

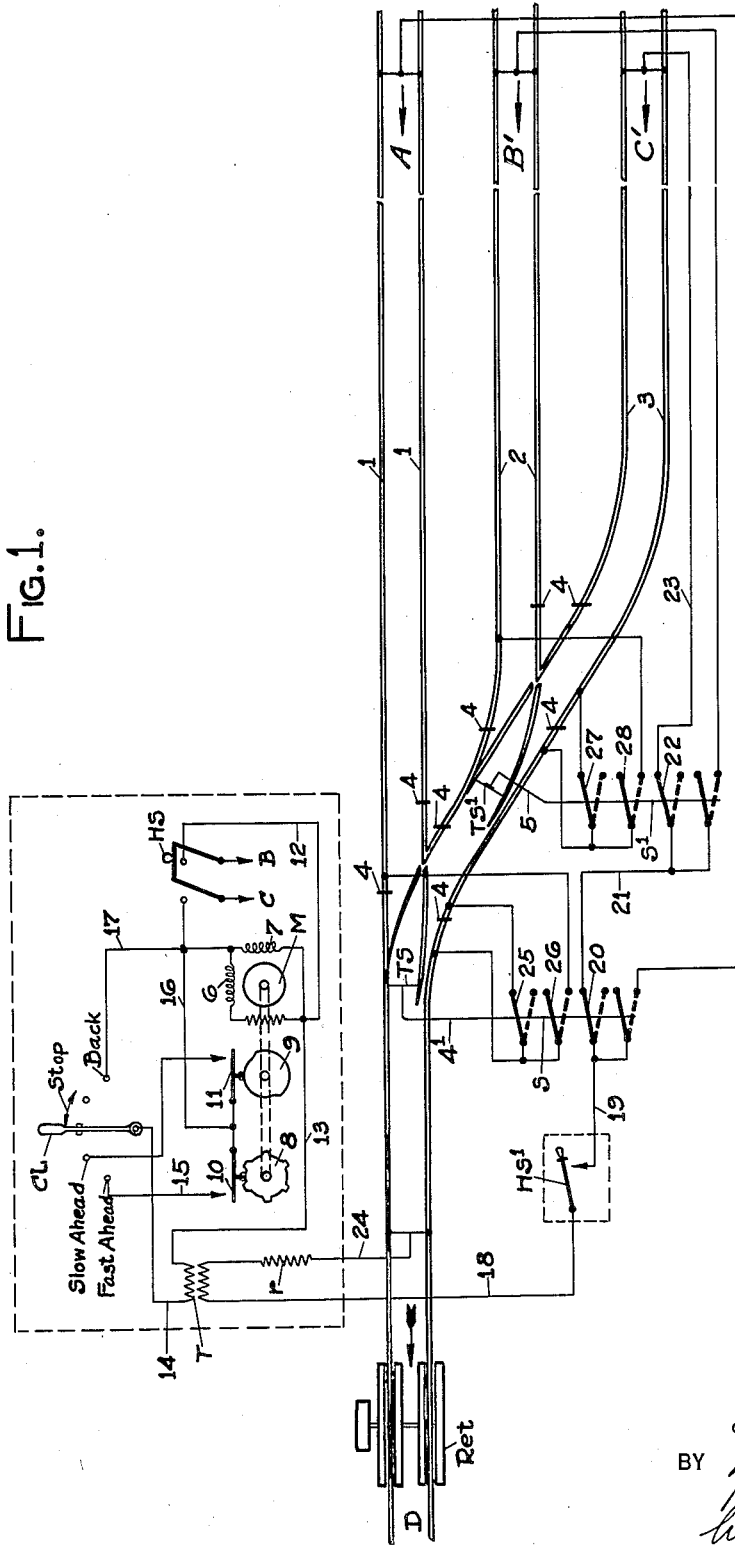

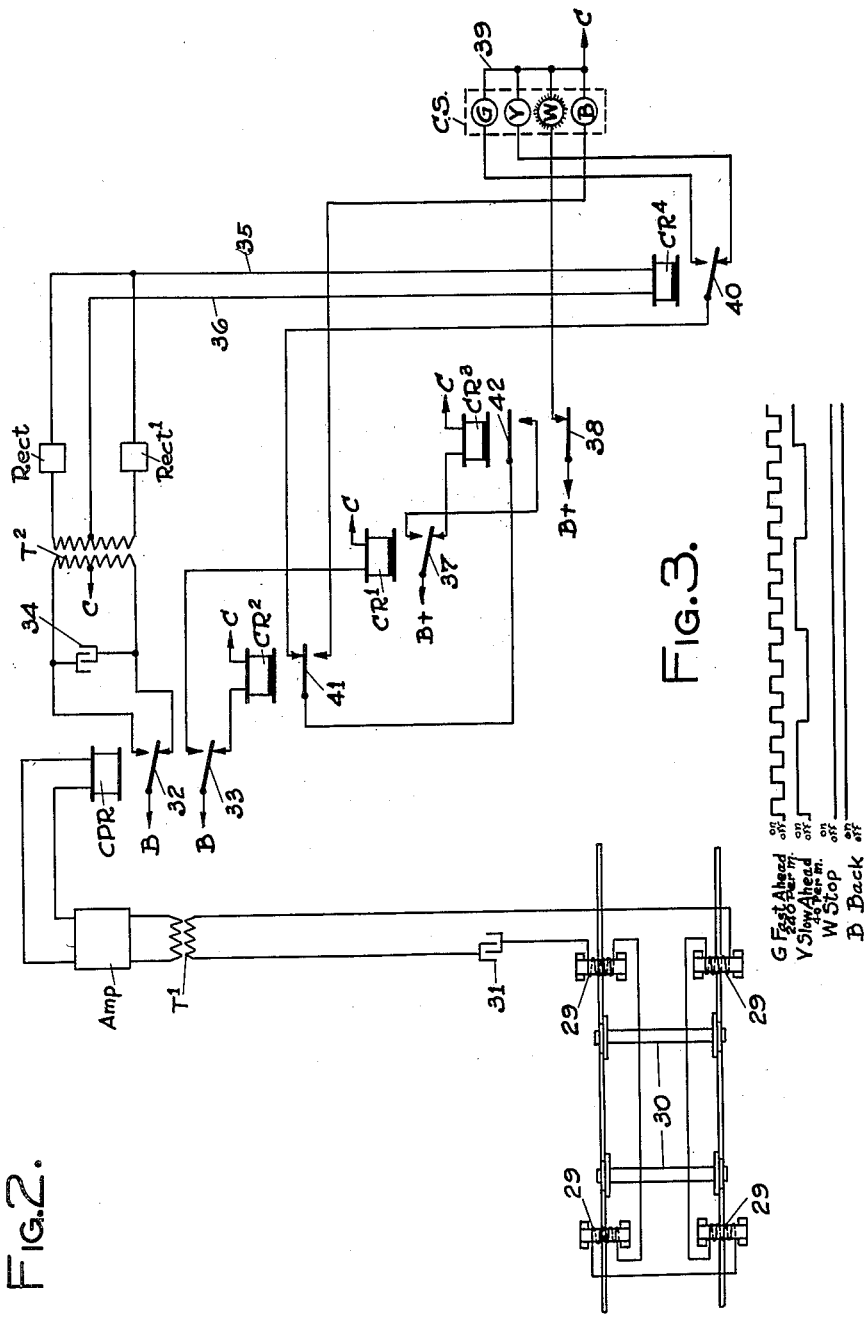

1,914,330

UNITED STATES PATENT OFFICE

WILLIAM D. HAILES, OF ROCHESTER, NEW YORK, ASSIGNOR TO GENERAL RAILWAY SIGNAL COMPANY, OF ROCHESTER, NEW YORK

TRAIN CONTROL SYSTEM

Application filed July 18, 1929. Serial No. 379,155.

This invention relates in general to train control systems, and has more particular reference to a system for controlling cars in classification yards.

It is usual in classifying cars in classification yards, to run cars to be classified from a plurality of tracks, to a single track, over a hump and through a retarder, to then run the cars onto the proper classification tracks. In this operation it is desirable to expedite matters as much as possible and, depending on conditions, the cars should be pushed over the hump and through the retarder either faster or slower, or cars on certain incoming tracks should be stopped or backed up in order to facilitate classification. It is therefore desirable to have a ready and certain manner of imparting desired information to the various engineers moving the cars.

With the above and other considerations in view it is proposed in accordance with this invention to provide a cab signal system automatically responsive to coded current placed on the track rails, for imparting the desired information to the engineers moving the cars.

It is further proposed, in accordance with this invention, to provide a simple and ready means for confining the coded current to the track rails of the particular route set up, whereby to give not only particular information, but to confine such information to a particular channel.

Further objects, purposes and characteristic features will appear as the description progresses, reference being made to the accompanying drawings showing, in a diagrammatic form, and in no manner in a limiting sense, one form which the invention can assume. In the drawings:—

Fig. 1 is a view of trackway apparatus in accordance with this invention.

Fig. 2 is a view of car-carried apparatus in accordance with this invention.

Fig. 3 is a diagrammatic illustration of codes which can be employed in connection with the invention.

Referring now to the drawings, and first to Fig. 1, there is here shown a plurality of incoming tracks A, $B^1$ and $C^1$ constituted respectively by track rails 1—1, 2—2, and 3—3, these tracks converging into a common track D, furnished with a track type retarder R$et$, which can be of any usual or desired form such for example, as shown in the Howe Patent 1,757,428, granted May 26, 1930.

As shown there is a track switch TS for controlling connection between track D and tracks A and $B^1$—$C^1$, and a track switch $TS^1$ for controlling connection between track D and tracks $B^1$ and $C^1$. With each track switch TS and $TS^1$, is associated a circuit switch S and $S^1$, respectively, for controlling circuits to be described below, the rods $4^1$ and 5 indicating connecting means whereby throwing of a track switch operates the corresponding circuit switch.

Constituting a further part of the trackway apparatus is a code motor M, having field windings 6 and 7, and controlled by a hand switch HS, for connecting the motor up to a source of alternating current, the two terminals of which are indicated, for convenience, by the letters B and C.

Operated by motor M, and preferably by being mounted on the same shaft, are code wheels 8 and 9, furnished with teeth, as shown, for operating vibrating contacts 10 and 11 for making and breaking, with a given frequency, the code applying circuit for thus intermittently placing energy on, and removing it from, the primary of a transformer T. The secondary of transformer T is connected, in series with a limiting reactance $r$, to the two track rails 1—1 in multiple, at one side. The other side of the secondary of transformer T is connected to a hand switch $HS^1$, positioned to be readily operable by the operator who uncouples the cars from the train as the cars are pushed over the hump and just before reaching the retarder Ret.

For controlling energy to the primary of transformer T, there is provided a control lever CL which, as indicated, is operable at will to any one of four positions; to the extreme left as viewed in Fig. 1, for sending the code indicating "fast ahead," to the next contact to the right for indicating "slow ahead," to the next contact to the right for indicating "stop," and to the contact at the extreme right for indicating "back".

In connection with the codes to be placed on the track rails, the code wheel 8 is furnished with six teeth while the code wheel 9 is furnished with but one tooth, whereby, if the motor M be operated at a rate to move code finger 10 240 times per minute, code wheel 9 will operate its code finger 11 at the rate of 40 times per minute. These two codes are shown graphically in Fig. 3, as is also shown the "stop" code which is constituted by having current steady-off of the primary of transformer T, and also the back code which is constituted by current steady-on the primary transformer T.

If it is desired to avoid use of insulated track joints the control current can be impressed on an insulated wire laid along the rail instead of on the rails.

Before taking up a description of the car-carried apparatus which automatically responds to coded energy in the track rails, it may be best to consider the operation of the apparatus of Fig. 1 in some little detail.

On closing the hand switch HS, motor M is energized through a circuit which includes one terminal B of an alternating current source, wire 12, the two field windings 6 and 7 of the induction motor M, in multiple, and back to the other side C of the source.

If the control lever CL be thrown to the extreme left, to put on the "fast ahead" code having a rate of, for example, 240 impulses per minute, an energizing circuit for the primary of transformer T is closed which includes wires 12 and 13, the primary of transformer T, wires 14 and 15, code finger 10, and wire 16.

In a like manner, with the control lever CL on the "slow ahead" contact, a circuit is completed for the primary of transformer T which includes code finger 11 rather than code finger 10 to thereby energize the primary of transformer T at the rate of 40 times per minute.

With the control lever CL at any position between the "slow ahead" contact and the "back" contact (and also between "fast ahead" and "slow ahead,") there is no circuit completed for energizing the primary of transformer T and thus the stop, or steady-off code is in control.

With the control lever CL at the extreme right, so as to contact with the "back" contact, current is steadily applied to the primary of transformer T through a circuit including wires 12 and 13, the primary of transformer T and wires 14 and 17.

The switches S and $S^1$ are so arranged as to automatically connect wire 18, leading from one side of the secondary of transformer T, to the entrance end of the route set up by the position of the track switches TS and $TS^1$.

For example, with track switch TS set reverse, and track switch $TS^1$ set reverse, the route is set up for cars from track $C^1$ to be pushed over the hump to the retarder Ret. With the track switches in this position, a circuit is completed which includes the secondary of transformer T, wire 18, hand switch $HS^1$, wire 19, switch blade 20 in its reverse position, wire 21, switch blade 22 in its reverse position, wire 23, the lower track rail 3, switch blade 27 reversed, lower track rail 3, switch blade 25 reversed, lower track rails 3 and 1, wire 24, and the limiting reactance $r$.

In a like manner, with the track switch TS in normal position for routing cars along track A, wire 18 is connected across the entrance end of track rails 1—1.

Also, with track switch TS reverse and track switch $TS^1$ normal, the $B^1$ route is set up, and wire 18 is then connected across the entrance end of track rails 2—2 so that the code current traverses the upper rail 2 as far as the connection through 28 in normal position.

The switch blades 25, 26, 27 and 28 of switches S and $S^1$, bridge around various of the insulating joints 4, in the various track rails, for permitting flow of current along the track rails, these insulating joints being employed, of course, to confine flow of control energy to the particular route set up.

Referring now to Fig. 2, there is here shown a car-carried apparatus including receiving coils 29, four in number, one over each track rail ahead of the car axles 30, and one over each track rail behind the car axles 30, whereby to inductively pick up control energy from either track rail regardless of direction of travel. The two receiving coils, over each track rail, are sufficiently spaced to bridge over any dead section in the track rails, whereby at least one of the receiving coils will always be subject to the inductive influence of any control current applied to the rails through transformer T, of Fig. 1.

Energy picked up by the receiving coils 29, is transmitted through a tuned circuit including a condenser 31, to the primary of transformer $T^1$, the secondary of which is connected to the input side of an amplifier Amp of any usual or desired form, with the output side of amplifier Amp connected to a coding primary relay CPR, having contact fingers 32 and 33. The tuned circuit for the primary of transformer $T^1$, can be dispensed with if desired, it merely being a refinement to be used, preferably, when the train control current is of a frequency different from the commercial frequencies employed.

With the apparatus connected up as just described, relay CPR picks up each time control energy is placed on the track rails, and releases each time it is removed from the track rails, whereby contact fingers 32 and 33 follow the code. With current steady on, relay CPR picks up and stays up, while with current steady off this relay releases and stays down.

Contact finger 32 operates to place direct current energy across the lower half, or the upper half, of the primary of transformer $T^2$, and then remove it therefrom, each time it makes and breaks contact with its back point and its front point, the primary of transformer $T^2$ having connected across it a condenser 34.

In the above described manner, a part of the secondary of transformer $T^2$ is momentarily energized each time relay CPR picks up and releases, to thereby energize a pick-up circuit for relay $CR^4$, through rectifiers Rect and $Rect^1$, whereby to energize relay $CR^4$ with uni-directional current. The flow of current is through one or the other of the rectifiers, wire 35, relay $CR^4$ and back through wire 36 to an intermediate tap on the secondary of transformer $T^2$.

Relay $CR^4$ is designed so as to pick up only if supplied with energy at a fast enough rate, and in the present case, is designed to pick up on the 240 per minute code, but not to pick up, or if picked up, to release, on the 40 per minute code.

Also included with relay $CR^4$, are relays $CR^1$, $CR^2$ and $CR^3$, these four relays constituting a decoding group of relays connected up to selectively respond to the code being received, to thereby selectively energize the cab signal CS which includes, in the present instance, a set of four lamps G, Y, W and B indicating, respectively, to the engineer, fast ahead, slow ahead, stop and back.

Relay $CR^2$, as is apparent from the drawing, is energized through contact finger 33 and back point of relay CPR, whereby it picks up on release of relay CPR.

In a similar manner $CR^1$ is energized through a circuit including contact finger 33 and front point of relay CPR, whereby to pick up when relay CPR picks up.

Relay $CR^3$ is energized through a circuit including contact finger 37 and back point of relay $CR^1$, whereby relay $CR^3$ is up when relay $CR^1$ is down, and vice versa.

All of the decoding relays $CR^1$–$CR^4$ are designed to be slow to release whereby to stay up, when once picked up for a period of time at least equal to the longest off period of train control current occurring in any of the control codes.

In the position of the various parts as shown in Fig. 2, the W lamp of cab signal CS is energized through a circuit including contact finger 38 and front point of relay $CR^3$. As shown in Fig. 3, the W lamp, indicating stop, is energized in response to a code constituted by train control current being steady off.

With current steady off, relay CPR is de-energized, to thereby assume its released position, thus to pick up relay $CR^2$, drop relay $CR^4$, and also drop relay $CR^1$. With relay $CR^1$ down, relay $CR^3$ is up. Under these conditions no complete circuit exists for energizing any of the other cab signals B, Y and G.

Assume now that control lever CL is thrown to the extreme left hand position, to place the fast ahead or G code on the track rails. Relay CPR then picks up and releases at a fast rate to send sufficient energy into relay $CR^4$ to pick up relay $CR^4$ and maintain it up. The rapidly vibrating contact finger 33 of relay CPR picks up each of the relays $CR^1$ and $CR^2$ and these relays stay up since, as explained above, they are slow to release. With relay $CR^1$ up, relay $CR^3$ releases and stays down. The G lamp of cab signal CS is now energized through a circuit including one terminal C of a source of electrical energy, wire 39, lamp G, contact finger 40 and front point of $CR^4$, contact finger 41 and front point of $CR^2$, contact finger 42 and back point of $CR^3$, and contact finger 37 and front point of $CR^1$, to the other terminal B.

If control lever CL be moved to place the slow ahead, or Y, code on the route set up, relays $CR^1$ and $CR^2$ pick up and stay up, relay $CR^3$ releases and stays down, and likewise relay $CR^4$ releases and stays down. Thus a circuit for energizing the Y lamp of the cab signal, is completed, including contact finger 40 and back point of $CR^4$, contact finger 41 and front point of $CR^2$, contact finger 42 and back point of $CR^3$, and contact finger 37 and front point of $CR^1$.

When lever CL is placed in the "back" position to place current steady-on on the track rails, relay CPR is picked up and held up, whereby to de-energize $CR^4$ and $CR^3$ and $CR^2$ and energize $CR^1$, whereby to complete an energizing circuit for the B lamp of the cab signal including, a back point of $CR^2$, a back point of $CR^3$ and a front point of $CR^1$.

With the invention as described above, it is apparent that a ready means has been provided for placing, at will, various codes on the track rails only of the particular route set up, together with car-carried means for selectively responding to the code applied to set up distinctive cab signals for advising the engineer how he should move the cars.

It is obvious, of course, that various different codes can be used, and that, while the invention has been described in connection with coded alternating current, there might also be used coded direct current instead of alternating current.

The decoding apparatus described above is merely one form to exemplify applicant's invention, it being obvious that other forms of decoders, together with other forms of codes, can be used if desired, as for example the decoders and codes disclosed in the W. D. Hailes application Ser. No. 228,058 filed October 22, 1927 in which coded alternating current is employed.

If coded direct current be employed, in place of the alternating current, codes and receiving and decoding means such as shown in the W. D. Hailes application, Ser. No. 249,457 filed January 25, 1928 can be used.

The above rather specific description of one form of system embodying the present invention, has been given solely by way of illustration, and is not intended, in any manner whatsoever, in a limiting sense. Obviously, this invention can assume many different physical forms, and is susceptible of numerous modifications, and all such forms and modifications are desired to be included by this invention, as come within the scope of the appended claims.

Having described my invention, I now claim:—

1. In a train control system, in combination, a plurality of tracks all converging into a main track, track switches for setting up various routes each extending from one of the plurality of tracks to the main track, and a circuit switch connected for operation by each track switch for connecting up the opposite ends of any route set up, to include the said route in a code applying circuit.

2. In a train control system, in combination, a plurality of tracks all converging into a main track, track switches for setting up various routes each extending from one of the plurality of tracks to the main track, a circuit switch connected for operation by each track switch for connecting up the opposite ends of any route set up in a code applying circuit, means for selectively placing coded energy on the code circuit, and insulating joints in the various track rails for restricting flow of coded energy to the track rails of the particular route set up.

3. In a train control system, in combination, a plurality of tracks all converging into a main track, track switches for setting up various routes each including one of the plurality of tracks and the main track, a circuit switch connected for operation by each track switch for connecting up the opposite ends of any route set up, in a code applying circuit, means for selectively placing coded energy on the code circuit, and insulating joints in the various track rails for restricting flow of coded energy to the track rails of the particular route set up, said circuit switches providing shunts around those insulating joints that would otherwise prevent the flow of the coded energy along the route set up.

4. In a train control system, in combination, a plurality of tracks all converging into a main track, track switches for setting up various routes each extending from one of the plurality of tracks to include the main track, a circuit switch connected for operation by each track switch for connecting up the main track and the other end of any route set up, in a code applying circuit, manually controlled means for selectively placing coded energy on the code circuit, and car-carried inductive receiving, decoding, and indicating means for selectively setting up various indications on the car in response to coded energy on the rails of the route set up.

5. In a train control system, in combination, a plurality of tracks all converging into a main track, track switches for setting up various routes each extending from one of the plurality of tracks to the main track, a circuit switch connected for operation by each track switch for connecting up the opposite ends of any route set up in a code applying circuit, means for selectively placing coded energy on the code circuit, insulating joints in the various track rails for restricting flow of coded energy to the track rails of the particular route set up, and car-carried inductive receiving, decoding, and indicating means for selectively setting up various indications on the car in response to coded energy on the rails of the route set up.

6. In a train control system, in combination, a plurality of tracks all converging into a main track, track switches for setting up various routes from the plurality of tracks to the main track, a circuit switch connected for operation by each track switch for connecting up the ends of any route set up in a code applying circuit, means for selectively placing coded energy on the code circuit, and car-carried inductive receiving, decoding, and indicating means for selectively setting up various indications on the car in response to coded energy on the rails of the route set up, there being a fast and a slow rate code, energy steady off the rails, and energy steady on the rails, giving four separate and distinct indications.

7. In a train control system, in combination, a plurality of tracks all converging into a main track, track switches for setting up various routes from the plurality of tracks to the main track, a circuit switch connected for operation by each track switch for connecting up the ends of any route set up in a code applying circuit, means for selectively placing coded energy on the code circuit, insulating joints in the various track rails for restricting flow of coded energy to the track rails for restricting flow of coded energy to the track rails of the particular route set up, car-carried inductive receiving, decoding, and indicating means for selectively setting up various indications on the car in response to coded energy on the rails of the route set up, there being a fast and a slow rate code, energy steady off the rails, and energy steady on the rails, giving four separate and distinct indications.

In testimony whereof I affix my signature.

WILLIAM D. HAILES.